United States Patent [19]

Benedict et al.

[11] Patent Number: 4,553,244
[45] Date of Patent: Nov. 12, 1985

[54] LASER BEAM ENERGY PROFILE SYNTHESIZER

[75] Inventors: George J. Benedict; Edward D. Reed, Jr., both of Sunnyvale; Robert W. Jones, San Jose, all of Calif.

[73] Assignee: GTE Communications Products Corporation, Stamford, Conn.

[21] Appl. No.: 603,809

[22] Filed: Apr. 25, 1984

[51] Int. Cl.$^4$ ............................................... H01S 3/08
[52] U.S. Cl. ......................................... 372/95; 372/9; 372/108; 372/99
[58] Field of Search ........................... 372/95, 93, 107; 378/108, 99, 9, 96; 350/620

[56] References Cited

U.S. PATENT DOCUMENTS 3,527,526  9/1970  Silvertooth .......................... 350/620
4,123,150 10/1978  Sziktas .................................. 372/97

Primary Examiner—William L. Sikes
Assistant Examiner—Léon Scott, Jr.
Attorney, Agent, or Firm—Douglas M. Gilbert; John F. Lawler

[57] ABSTRACT

The annular energy distribution in the output beam of a laser having an unstable resonator is evenly distributed across the entire beam profile by a synthesizer comprising a pair of mirrors adjacent to the output end of the resonator and operative on the output beam to redirect part of the beam from the annular outer portion to the energy-vacant central portion. One of the pair of mirrors is partially optically transmissive and concavely shaped and is disposed to reflect and converge part of the outer beam portion toward the other mirror and to transmit the balance. The other mirror is highly reflective and convexly shaped and is disposed to redirect and collimate the reflected beam part within the central portion toward the concave mirror parallel to the outer beam portion. Part of the twice reflected beam is transmitted through the concave mirror and the balance is again reflected and further converged toward the convex mirror as the cycle is repeated several times to synthesize an output beam with a substantially uniform energy profile.

5 Claims, 2 Drawing Figures

LASER BEAM ENERGY PROFILE SYNTHESIZER

BACKGROUND OF THE INVENTION

This invention was made under a contract with the Department of the Navy.

This invention relates to lasers and more particularly to lasers having unstable resonators.

Laser resonators can be divided into two broad categories, stable and unstable. The latter is ideally suited for high energy lasers, i.e., outputs greater than 250 millijoules, when small output beam divergence (near diffraction-limited) is desired. The energy in the output beam from an unstable laser resonator is distributed across the beam in the form of an annulus. There is little or no energy in the central portion of the beam in the near field of the laser, that is, distances a few meters from the laser. At much larger distances (the far field), diffraction causes energy to enter the central beam portion.

There are many unstable resonator laser applications that cannot tolerate a near field energy intensity profile depletion or "hole." Prior attempts to eliminate such a "hole" have not been satisfactory. A toroidal mirror device called an axicon has been used with 10.6 micron lasers for this purpose but develops a sharp intensity peak on the beam axis and consequently cannot effectively solve the problem. Furthermore, it is difficult to fabricate an axicon for use at short optical wavelengths (e.g., 1 μm or shorter).

This invention is directed to an effective solution to this problem.

OBJECTS AND SUMMARY OF THE INVENTION

A general object of the invention is the provision of an efficient laser beam energy synthesizer that is made from conventional optical elements and therefore is simple and economical to construct.

A further object is the provision of such a synthesizer that is useful at wavelengths of 1 μm or shorter.

These and other objects of the invention are achieved with a pair of mirrors which reflect part of the unstable resonator laser output beam into the central energy-vacant portion thereof in successive reflections or cycles while maintaining collimation of the reflected light with that of the unreflected beam. One partially optically transmissive mirror reflects and converges part of the annular output beam to the other mirror and transmits the balance. The other mirror, which has a diameter equal to that of the central portion of the beam and is highly reflective, redirects and collimates the reflected part of the beam parallel to the output beam axis toward the one mirror. Through a succession of such partial reflection and converging cycles, beam energy is uniformly redistributed over the beam profile.

DESCRIPTION OF PREFERRED EMBODIMENTS

Figure 1:
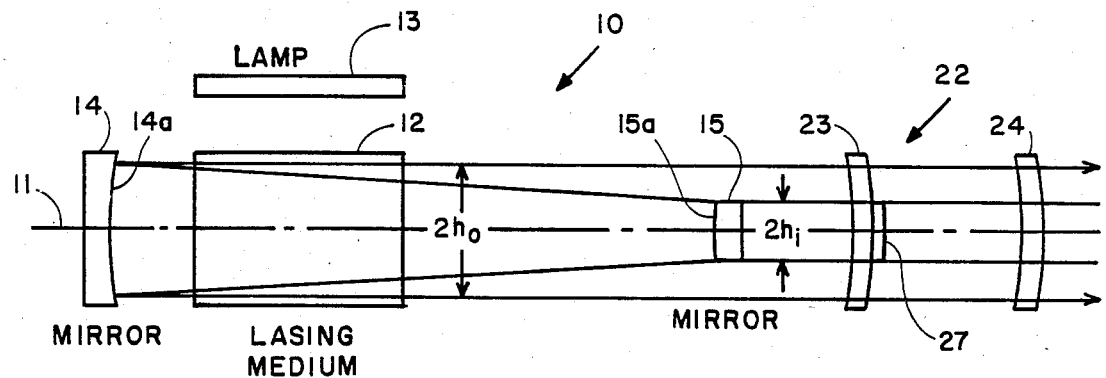
FIG. 1 is a schematic view of a laser system with an unstable resonator and having an energy profile synthesizer embodying this invention.

Referring now to the drawings, FIG. 1 illustrates a preferred embodiment of the invention in conjunction with a laser system 10 having an optical axis 11 and comprising a lasing medium 12, a lamp 13 for optically pumping medium 12, a highly reflecting (HR) mirror 14 axially aligned with and having a concave surface 14a facing one end of medium 12, and a highly reflecting mirror 15 axially aligned with and having a convex surface 15a facing the other end of medium 12. Mirror 15 has a diameter substantially smaller than that of mirror 14. The axially propagating generally cylindrical light beam 17 produced by the optically pumped medium 12 is reflected between mirrors 14 and 15 which define the unstable resonator of the system. Beam 17 has an outside diameter $2h_o$ substantially larger than diameter $2h_i$ of convex mirror 15 and less than the diameter of mirror 14. The output from this resonator propagates to the right, as viewed, of mirror 15, and is an annular beam having an outer portion 19 and an energy-vacant central portion 20 in the shadow of mirror 15 for distances a few meters from the laser, called the near field of the laser. At much larger distances, typically greater than 10 meters, called the far field, diffraction causes energy to be diverted into the central portion 20 of the beam. For purposes of this discussion, the diameter of central portion 20 of the beam in the near field is $2h_i$.

Figure 2:
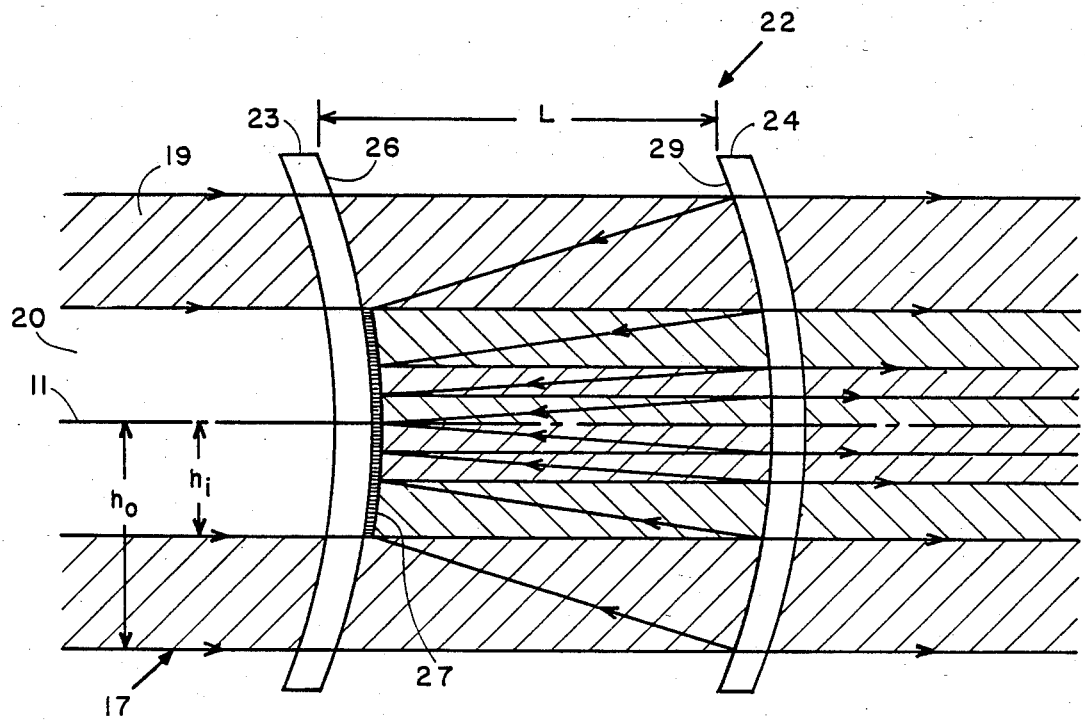
FIG. 2 is an enlarged schematic view of the synthesizer showing details of construction and illustrating its operation.

In accordance with this invention, energy is distributed from the outer portion 19 of output beam 17 to the central portion 20 thereof by an energy profile synthesizer 22 comprising a first mirror 23 adjacent to mirror 15 and a second mirror 24 axially spaced from mirror 23 by a distance L, see FIG. 2.

In a preferred embodiment of the invention, each of mirrors 23 and 24 is a concavo-convex transparent glass disc and is disposed coaxially of and extends transversely of output beam 17 as the latter propagates beyond resonator mirror 15. Mirror 23 has a convex surface 26 with a radius $R_2$ of curvature and has a highly reflecting (HR) disc-shaped coating 27 formed coaxially on the center part of surface 26. Coating 27 has a diameter $2h_i$ and therefore extends across the entire central portion 20 of annular output beam 17.

Mirror 24 has a concave surface 29 facing mirror 23 and coated to partially reflect light from outer portion 19 of beam 17 while transmitting the balance, the transmitted light remaining collimated as it propagates to the right, as viewed. In practice approximately 20% of beam 17 is reflected by mirror surface 29. This reflected light is also reduced in size or converged by concave surface 29, the radius $R_1$ of curvature of surface 29 and the spacing L thereof from surface 26 of mirror 23 being selected so that the converged reflected light is incident on the outer part of HR coating 27 as shown in FIG. 2. Radius $R_2$ of curvature of coating 27 is selected to recollimate light reflected by it to mirror 24 which transmits part and reflects and converges part as described above. Successive partially-reflected annuli of light from the annular output beam 17 are distributed or "nested" into successively smaller areas of the central portion 20 of the beam to provide a substantially uniform energy intensity profile across the entire beam. FIG. 2 illustrates two of such reflection cycles. While less light is reflected on successive cycles, the area into which each reflected light annulus is nested is proportionally smaller so that the energy intensity remains substantially constant.

All surfaces of mirrors 23 and 24 except surface 29 and coating 27 are anti-reflection (AR) coated for the light wavelength of the laser system.

The design of synthesizer 22 for the collimated laser output from an unstable resonator is derived from the equation for a positive branch confocal unstable resonator. The pattern which is transmitted through partially transmitting mirror 24 consists of nested annuli of light which are each collimated to the degree allowed by diffraction.

The ratio of incident beam outside-to-inside diameters, M, determines the ratio of the mirror surface radii:

$$M = \frac{2h_o}{2h_i} = \frac{R_1}{R_2} \quad (1)$$

The mirror separation L is given by the equation for the confocal unstable resonator:

$$L = \frac{R_2}{2}(M - 1) \quad (2)$$

The final condition to determining the values for $R_1$, $R_2$ and L is imposed by diffraction, which tends to make the choice of the outside diameter $2h_o$ of the laser beam to be large. In practice, spherical aberration limits the ratio of $2h_o$ to the focal length of mirror 23. To minimize spherical aberration effects, the following relation obtains:

$$\frac{R_2}{2h_o} \gtrsim 20 \quad (3)$$

so that $R_2$, and therefore L, cannot be made arbitrarily small since $2h_o$ is finite. When the input beam diameter $2h_o$ is established, the values for $R_1$, $R_2$, and L can be determined.

The synthetic beam can be modeled as a number of independent concentric annular regions. Selection of the partial mirror reflectivity, r, forces each region to have the same energy density. The incident annulus possesses energy $E_o$, and is bounded by radii $h_o$ and $h_i$ as shown in FIG. 2. The nth annulus transmitted by the synthesizer contains energy $E_n$, which has made n−1 reflections from the partial mirror and then passes through the partial mirror with transmission t, so that:

$$E_n = r^{n-1} t E_o \quad (4)$$

The area $A_n$ of nth annular region bounded by radii $h_{n-1}$ and $h_n$ is given by:

$$A_n = \pi(h_{n-1}^2 - h_n^2) \quad (5)$$

where $h_n = \epsilon^n h_o$, and $\epsilon$ is the ratio of the inside to outside diameters of the incident beam. Then:

$$A_n = \pi h_o^2 \epsilon^{2(n-1)}(1 - \epsilon^2) \quad (6)$$

The transmitted energy density of the nth annulus is:

$$P_n = \frac{E_n}{A_n} \quad (7)$$

$$P_n = \frac{t E_o}{\pi h_o^2 \epsilon^{2(n-1)}(1 - \epsilon^2)}$$

For successively smaller regions, the transmitted energy density is always equal to a constant value:

$$P = \frac{t E_o}{\pi h_o^2 (1 - \epsilon^2)} \quad (8)$$

provided $r^{n-1} = \epsilon^{2(n-1)}$. The (n−1)th root gives the condition $r = \epsilon^2$.

For typical cases of interest, values of the parameters are:

| M   | ε   | r   | t   |
|-----|-----|-----|-----|
| 1.5 | .67 | .44 | .56 |
| 2.0 | .50 | .25 | .75 |
| 2.5 | .40 | .16 | .84 |
| 3.0 | .33 | .11 | .89 |

The design of a synthesizer embodying this invention begins with the value of the beam outside-to-inside diameters ratio M which is fixed for the unstable laser resonators being used. The values of $R_1$, $R_2$, and L are then determined using equations (1), (2) and (4). The diameter of the HR coating 27 on convex mirror surface 26 is determined from beam diameter $2h_o$ and M. Finally the reflectivity of surface 29 is given by $r = \epsilon^2$. The synthesizer produced by these design criteria smooths the annularly shaped beam profile from an unstable-resonator laser, assuming the beam is collimated.

The following unstable resonator laser system embodying the invention has been constructed and operated successfully by producing an output beam in the near field having a substanitally uniform energy intensity profile:

| Laser | Q-switched Nd:YAG |
|---|---|
| Wavelength | 0.532 μm |
| Output beam | |
| Outside diameter $2h_o$ | 16 mm |
| Inside diameter $2h_i$ | 7 mm |
| Synthesizer 22 | |
| Mirror 23 | |
| Material | glass |
| Thickness | 3 mm |
| Radius of curvature $R_2$ (nominal) | 34 mm |
| Mirror 24 | |
| Material | glass |
| Thickness | 3 mm |
| Radius of curvature $R_1$ (nominal) | 90 mm |

What is claimed is:

1. In a laser system having an optical axis, a lasing medium, means to energize said medium to produce along said axis a laser beam having a predetermined diameter, and first and second mirrors spaced from opposite ends of said medium along said axis, said first mirror having a concave surface facing said medium and having a diameter no less than the diameter of said beam, said second mirror having a convex surface facing said medium and having a diameter less than that of said beam whereby said first and second mirrors define an unstable laser resonator, the portion of said laser beam propagating beyond said second mirror constituting the output beam from said resonator and having an annular cross-sectional shape with an outer portion and a central portion, said beam having substantially less energy in said central portion than in said outer portion, the improvement of beam energy profile synthesizer means comprising:

third and fourth mirrors traversing and being spaced along said axis, said third mirror being proximate to said second mirror, said fourth mirror having a concave surface opposite said third mirror and being partially optically transmitting and intersecting said output beam whereby to reflect part of said output beam toward said third mirror and to transmit the balance of said output beam; and said third mirror having a totally reflective convex surface opposite said fourth mirror and having a diameter substantially the same as the diameter of said central portion of said beam, the radii of curvature of the convex and concave surfaces of said third and fourth mirrors, respectively, being predetermined whereby part of the output beam is transmitted by said fourth mirror and the balance is reflected thereby to said convex surface of the third mirror and is again reflected by a highly reflective disc-shaped coating disposed on said convex surface toward said fourth mirror in said central portion of the beam.

2. The laser system according to claim 1 in which each of said third and fourth mirrors is concavo-convex.

3. The laser system according to claim 1 in which said outer and central portions of said beam have outside diameters, respectively, the ratio M of the outside diameters of said outer and central portions having the following relation to the radius $R_1$ of curvature of said concave surface and the radius $R_2$ of curvature of said convex surface:

$$M = R_1/R_2.$$

4. The laser system according to claim 3 in which said surfaces have an axial spacing L, said spacing being defined by the equation:

$$L = \frac{R_2}{2}(M - 1)$$

5. A method of synthesizing a uniform energy profile in the collimated annular output beam of an unstable resonator laser system in the near field, consisting of the steps of:

reflecting and converging part of said output beam into an energy-vacant central portion thereof with a partially reflective mirror and transmitting the balance of said beam;

re-reflecting said part of the beam toward said mirror parallel to the beam and in said central portion thereof; and successively repeating the reflection, convergence and re-reflection of untransmitted parts of the beam to provide a beam energy profile with a substantially uniform intensity in the near field.

* * * * *